(12) United States Patent
Rainisto

(10) Patent No.: US 9,674,698 B2
(45) Date of Patent: Jun. 6, 2017

(54) METHOD AND APPARATUS FOR PROVIDING AN ANONYMOUS COMMUNICATION SESSION

(71) Applicant: Nokia Corporation, Espoo (FI)

(72) Inventor: Roope Aleksi Rainisto, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 180 days.

(21) Appl. No.: 14/337,994

(22) Filed: Jul. 22, 2014

(65) Prior Publication Data

US 2016/0029210 A1 Jan. 28, 2016

(51) Int. Cl.
*H04M 1/66* (2006.01)
*H04W 12/02* (2009.01)
(Continued)

(52) U.S. Cl.
CPC ............. *H04W 12/02* (2013.01); *H04L 9/083* (2013.01); *H04W 4/206* (2013.01); *H04W 12/04* (2013.01); *H04W 60/04* (2013.01); *G06Q 50/01* (2013.01)

(58) Field of Classification Search
CPC .... G06Q 50/01; G06Q 30/0256; H04L 51/32; H04L 67/22; H04L 67/306; H04L 63/104;
(Continued)

(56) References Cited

U.S. PATENT DOCUMENTS 8,359,643 B2   1/2013 Low et al.
2002/0122391 A1   9/2002 Shalit
(Continued)

FOREIGN PATENT DOCUMENTS

WO   2011121542 A1   10/2011
WO   2013142953 A1   10/2013

OTHER PUBLICATIONS

Makeuseof, "How can I put email addresses in a group so sending a single email forwards the email to all people in the group?", retrieved from http://www.makeuseof.com/answers/how-can-i-put-email-addresses-in-a-group-so-sending-a-single-email-forwards-the-email-to-all-people-in-the-group/, 2014, 1 page.
(Continued)

*Primary Examiner* — Fred Casca
(74) *Attorney, Agent, or Firm* — Ditthavong & Steiner, P.C.

(57) ABSTRACT

An approach is provided for generating and/or sharing of at least one key upon registering communication identifiers associated with one or more devices for an anonymous communication session. The approach involves causing, at least in part, a generation of at least one key associated with at least one anonymous communication session. The approach also involves causing, at least in part, a transmission of the at least one key to one or more devices. The approach further involves causing, at least in part, a registration of one or more actual communication identifiers associated with the one or more devices to the at least one anonymous communication session based, at least in part, on receiving the at least one key from the one or more devices, wherein the registration does not expose the one or more actual communication identifiers to the one or more devices of the at least one anonymous communication session.

20 Claims, 14 Drawing Sheets

(51) Int. Cl.
  *H04W 4/20* (2009.01)
  *H04L 9/08* (2006.01)
  *H04W 12/04* (2009.01)
  *H04W 60/04* (2009.01)
  *G06Q 50/00* (2012.01)

(58) Field of Classification Search
  CPC ... H04L 2209/42; H04L 51/046; H04L 63/04; H04L 63/083; H04L 12/588; G06F 17/30165; G06F 21/6254; H04W 4/206
  USPC ............ 455/411, 456.3, 519; 705/319, 26.42
  See application file for complete search history.

(56) References Cited

U.S. PATENT DOCUMENTS

| | | |
|---|---|---|
| 2005/0114453 A1 | 5/2005 | Hardt |
| 2009/0083183 A1 | 3/2009 | Rao et al. |
| 2010/0175119 A1 | 7/2010 | Vitaletti |
| 2012/0042392 A1* | 2/2012 | Wu ...................... H04L 63/101 726/28 |
| 2012/0311020 A1* | 12/2012 | Brown ................ G06F 12/0862 709/203 |
| 2013/0045759 A1 | 2/2013 | Smith |
| 2013/0066963 A1* | 3/2013 | Odio ...................... G06Q 10/10 709/204 |
| 2013/0254847 A1 | 9/2013 | Adams et al. |
| 2013/0311562 A1 | 11/2013 | Platt et al. |
| 2014/0074629 A1* | 3/2014 | Rathod .................. G06Q 10/10 705/14.73 |
| 2014/0188990 A1 | 7/2014 | Fulks |
| 2014/0237578 A1* | 8/2014 | Bryant .................. G06Q 10/10 726/7 |
| 2015/0085707 A1* | 3/2015 | Shi ...................... H04L 12/1831 370/261 |

OTHER PUBLICATIONS

Mardenfeld et al., "GDC: Group Discovery using Co-location Traces", New Jersey Institute of Technology, Aug. 2010, 8 pages.
Office Action for corresponding European Patent Application No. 15174929.8-1870, dated Dec. 4, 2015, 8 pages.

* cited by examiner

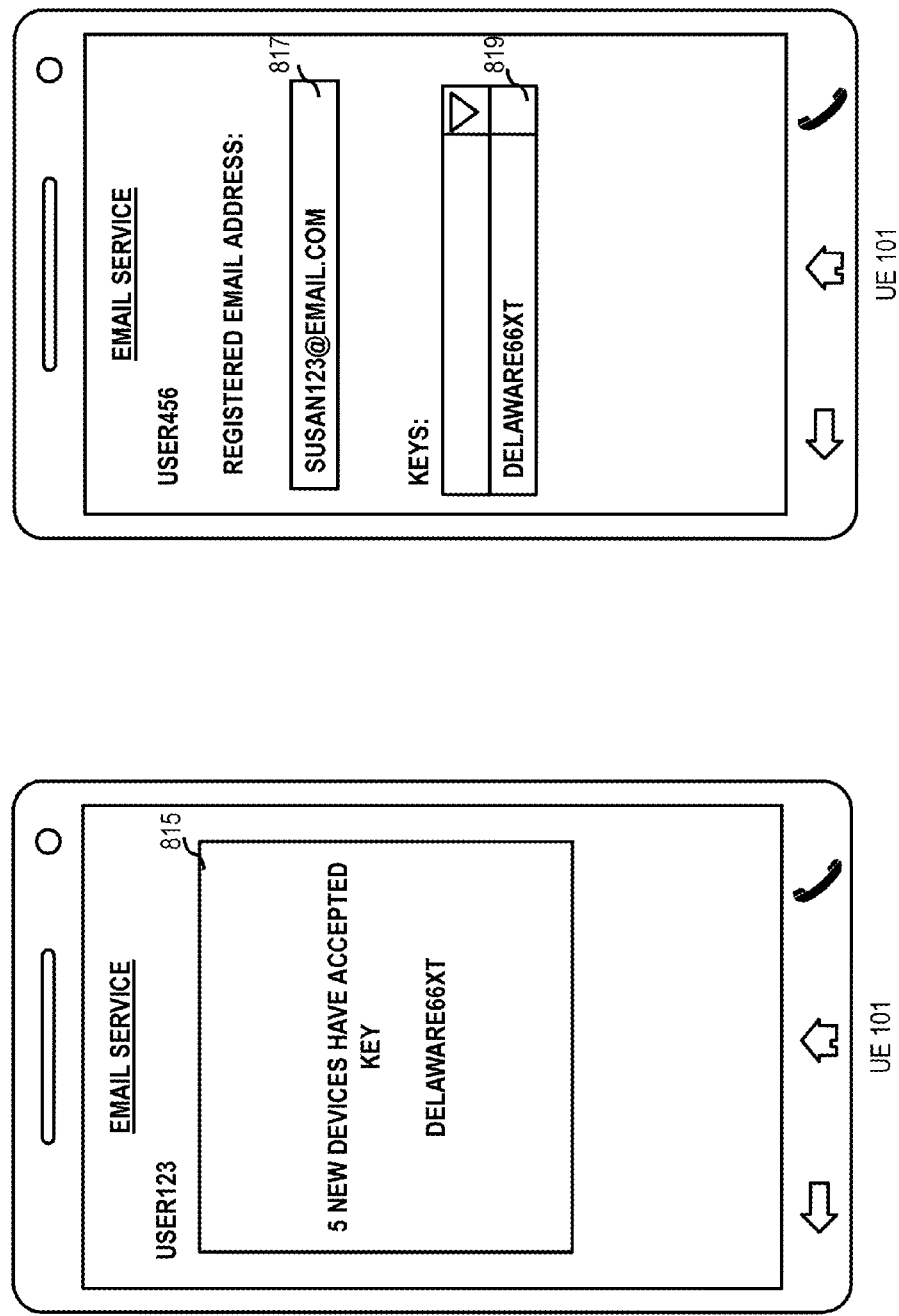

METHOD AND APPARATUS FOR PROVIDING AN ANONYMOUS COMMUNICATION SESSION

BACKGROUND

Service providers and device manufacturers (e.g., wireless, cellular, etc.) are continually challenged to deliver value and convenience to consumers by, for example, providing compelling network services. Social network has transformed the way people communicate, however the technological advancement fails to address the discovery problems, the privacy problems, and the memory problems faced by users during a communication session. In one scenario, it is difficult for a user to collect contact information from other users within a vicinity, such process may be time consuming and may result in errors in communicating the contact information during the brief encounter. In another scenario, a user may not want to disclose his/her contact information to other users for privacy reasons. In a further scenario, a user may not remember the contact information of other users, and finding the contact information may be inefficient. As a result, the new challenge for service providers and device manufacturers is to find the optimal approach to best serve the consumers by provisioning an efficient communication session by addressing these problems.

SOME EXAMPLE EMBODIMENTS

Therefore, there is a need for an approach for generating and/or sharing of at least one key upon registering communication identifiers associated with one or more devices for an anonymous communication session.

According to one embodiment, a method comprises causing, at least in part, a generation of at least one key associated with at least one anonymous communication session. The method also comprises causing, at least in part, a transmission of the at least one key to one or more devices. The method further comprises causing, at least in part, a registration of one or more actual communication identifiers associated with the one or more devices to the at least one anonymous communication session based, at least in part, on receiving the at least one key from the one or more devices, wherein the registration does not expose the one or more actual communication identifiers to the one or more devices of the at least one anonymous communication session.

According to another embodiment, an apparatus comprises at least one processor, and at least one memory including computer program code for one or more computer programs, the at least one memory and the computer program code configured to, with the at least one processor, cause, at least in part, the apparatus to cause, at least in part, a generation of at least one key associated with at least one anonymous communication session. The apparatus is also caused to cause, at least in part, a transmission of the at least one key to one or more devices. The apparatus is further caused to cause, at least in part, a registration of one or more actual communication identifiers associated with the one or more devices to the at least one anonymous communication session based, at least in part, on receiving the at least one key from the one or more devices, wherein the registration does not expose the one or more actual communication identifiers to the one or more devices of the at least one anonymous communication session.

According to another embodiment, a computer-readable storage medium carries one or more sequences of one or more instructions which, when executed by one or more processors, cause, at least in part, an apparatus to cause, at least in part, a generation of at least one key associated with at least one anonymous communication session. The apparatus is also caused to cause, at least in part, a transmission of the at least one key to one or more devices. The apparatus is further caused to cause, at least in part, a registration of one or more actual communication identifiers associated with the one or more devices to the at least one anonymous communication session based, at least in part, on receiving the at least one key from the one or more devices, wherein the registration does not expose the one or more actual communication identifiers to the one or more devices of the at least one anonymous communication session.

According to another embodiment, an apparatus comprises means for causing, at least in part, a generation of at least one key associated with at least one anonymous communication session. The apparatus also comprises means for causing, at least in part, a transmission of the at least one key to one or more devices. The apparatus further comprises means for causing, at least in part, a registration of one or more actual communication identifiers associated with the one or more devices to the at least one anonymous communication session based, at least in part, on receiving the at least one key from the one or more devices, wherein the registration does not expose the one or more actual communication identifiers to the one or more devices of the at least one anonymous communication session.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 8C represents a scenario wherein at least one device receives confirmation notification of receipt of a key by other nearby devices, according to one example embodiment;

DESCRIPTION OF SOME EMBODIMENTS

Examples of a method, apparatus, and computer program for generating and/or sharing of at least one key upon registering communication identifiers associated with one or more devices for an anonymous communication session are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
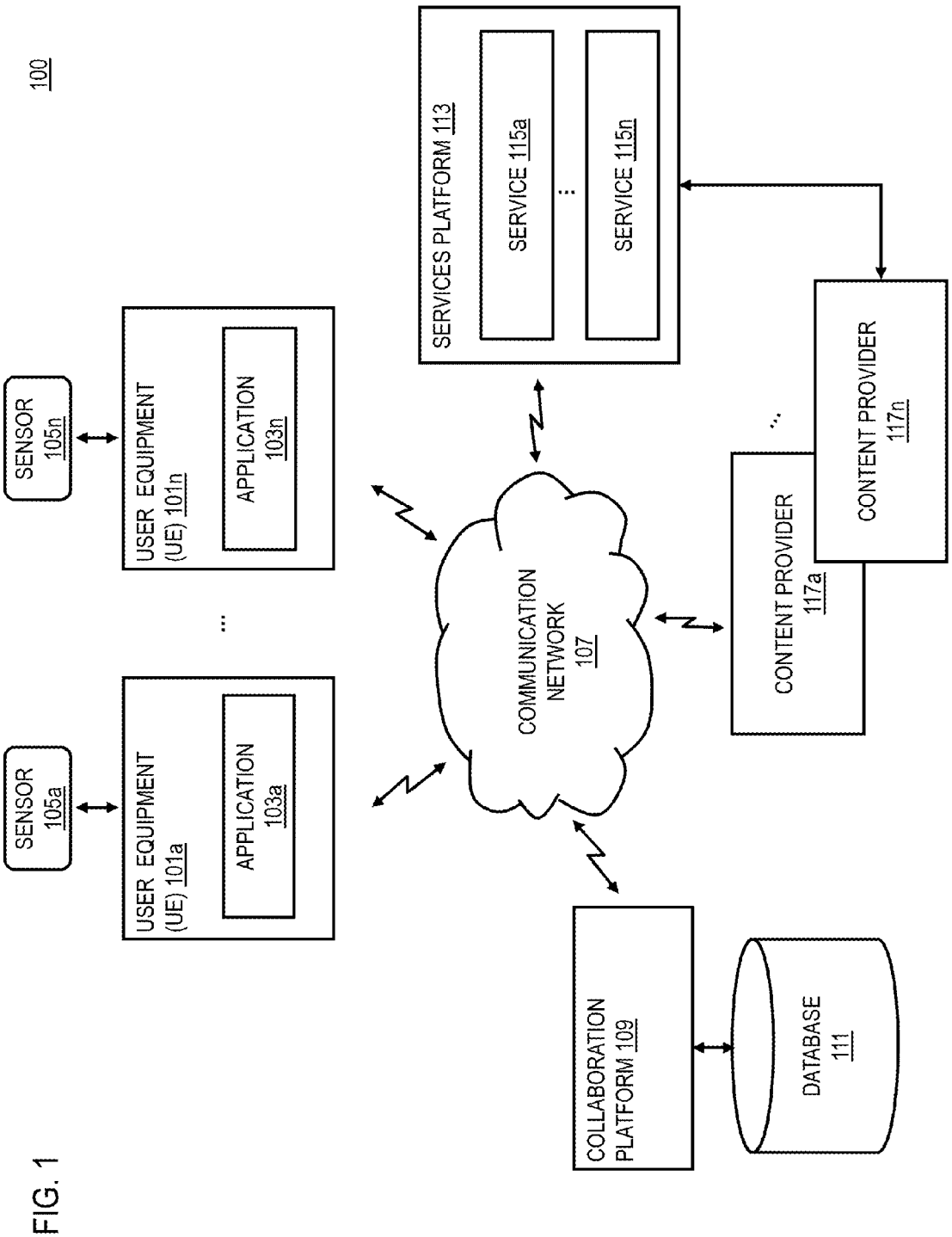
FIG. 1 is a diagram of a system capable of generating and/or sharing of at least one key upon registering communication identifiers associated with one or more devices for an anonymous communication session, according to one embodiment.

FIG. 1 is a diagram of a system capable of generating and/or sharing of at least one key upon registering communication identifiers associated with one or more devices for an anonymous communication session, according to one embodiment. As discussed, privacy is a very common problem while sharing contents with a group of people. Amongst the various services that cater to online content sharing, email is one of the popular content sharing mechanisms as they are universally utilized. Almost every user with online access has one or more email addresses. However, email only works after a user knows the email addresses of other users. But this is not a trivial issue, there are three main problems, namely:

1. Discovery problem: Not knowing email address of other users;
2. Privacy problem: Not wanting to give email address for privacy reasons; and
3. Memory problem: Not remembering whom to email.

Though these problems are related, they are separate. Any event that involves a group of people accounts for a potential need to share the event information afterwards with the group. In one example embodiment, a user may share messages and pictures taken during a shared event (e.g. a concert or a wedding). The user may not know the email addresses of all the other people attending the event, for example, if a user attends a concert with twenty-five other people, it is not reasonable for him to approach each of the twenty-five other people asking for their email addresses. Even if the user is successful in asking the twenty-five other people for the email addresses, the other people might hesitate to give their email address unless they know the user beforehand. Further, users are wary of spam emails and their email addresses becoming public knowledge. On the other hand, even if a user is capable of collecting email addresses of twenty-five other people, the user might not remember who was present during an event when sharing the event information afterwards.

To address this problem, the system 100 of FIG. 1 introduces the capability to generate and/or share at least one key upon registering communication identifiers associated with one or more devices for an anonymous communication session. In one scenario, sensors 105 associated with at least one device may detect one or more other devices within a proximate range for a certain time-period. Then, the at least one device takes the initiative and sends a request for key generation, whereupon system 100 generates a random key to be used during the communication session. The generated key may be a short piece of text, for instance, "delaware66xt". Then, the system 100 causes a sharing of the key with the one or more other devices within a proximate range. The system 100 automatically registers the user devices alongside the contact information (e.g. user's email address) of the users associated with the user devices once the user devices accept the key. Subsequently, each of the user devices that receive the key communicates to the system 100 that they have received the key. In one embodiment, each user is associated with a key.

In one scenario, the system 100 monitors and records user activity, and matches the key with the location information and the contextual information of the one or more users. In one scenario, whenever a user wishes to contact the group that has been nearby, he/she can simply send an email to the key email address. Then, the system 100 performs an email forwarding service, wherein messages sent to the key email address (e.g. key@emailaddress.com) is forwarded to the actual email addresses of all the users registered with the system.

In one scenario, the key generated by system 100 remain relevant as long as the system 100 considers the sessions to continue. When one or more other user devices come in range during the continuation of a session, the system 100 shares the key with the one or more other user devices. As soon as the one or more other user devices accept the key, it automatically registers itself with the system.

As shown in FIG. 1, the system 100 comprises user equipment (UE) 101*a*-101*n* (collectively referred to as UE 101) that may include or be associated with applications 103*a*-103*n* (collectively referred to as applications 103), and sensors 105*a*-105*n* (collectively referred to as sensors 105). In one embodiment, the UE 101 have connectivity to the collaboration platform 109, the services platform 113 and the content provider 117 via the communication network 107.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the applications 103 may be any type of application that may perform various processes and/or functions at the UE 101. In one embodiment, the applications 103 may be location based applications, social networking applications, calendar applications, content (e.g., audio, video, images, etc.) provisioning services, etc. By way of example, application 103 may determine location information and/or temporal information associated with the UE 101 that may be processed as contextual information. In one embodiment, one of the applications 103 at the UE 101 may act as a client for the collaboration platform 109 and may perform one or more functions associated with the functions of the collaboration platform 109.

By way of example, the sensors 105 may be any type of sensor. In certain embodiments, the sensors 105 may include, for example, a global positioning sensor for gathering location data, a network detection sensor for detecting wireless signals or network data, temporal information and the like, a camera/imaging sensor for gathering image data, an audio recorder for gathering audio data etc. This information is provided to the collaboration platform 109 for processing to determine proximity information associated with one or more UE 101.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the collaboration platform 109 may be a platform with multiple interconnected components. The collaboration platform 109 may include multiple servers, intelligent networking devices, computing devices, components and corresponding software for performing the function of generating and/or sharing of at least one key upon registering communication identifiers associated with one or more devices for an anonymous communication session. In one embodiment, the collaboration platform 109 may generate a key upon receiving a request for a key from at least one device. In another embodiment, the collaboration platform 109 may generate a key upon detecting one or more devices within a certain range for a pre-defined time period. In one scenario, the exact format of keys does not matter. Since numerous keys may be generated (e.g. millions of keys everyday), the keys may be completely random to make them easier to share. These keys may elapse after a period of un-use.

In one embodiment, the collaboration platform 109 may automatically register actual communication identifiers associated with one or more devices that requests the keys. In another embodiment, the collaboration platform 109 may register actual communication identifiers associated with one or more other devices upon receiving the key from the one or more devices. In one scenario, the collaboration platform 109 may register the contact information of one or more users for establishing an anonymous communication session, wherein the contact information of the users are not disclosed by creating a key that is shared amongst the users during the communication session.

In one embodiment, the collaboration platform 109 may cause a transmission of at least one key to one or more devices. The collaboration platform 109 may share the key with other devices based, at least in part, on proximity information.

In one embodiment, the collaboration platform 109 may include or have access to database 111 to access or store any kind of data, such as key information, historical user information, location proximity information, temporal information, contextual information, etc. Data stored in the database 111 may, for instance, be provided by the UE 101, the services platform 113, one or more services 115a-115n (or services 115), or one or more content providers 117a-117n (or content providers 117). In one embodiment, the database 111 may include an index for key, and the collaboration platform 109 may query the index based, at least in part, on a provided input, such as, from interacting with applications 103 via the UE 101. In one scenario, the database 111 may store profile information for each user, wherein the profile information contains their real email addresses, phone numbers, social media user identifier etc.

In one embodiment, the services platform 113 may include any type of service. By way of example, the services platform 113 may include location based services, social networking services, content (e.g., text, images, etc.) provisioning services, application services, storage services, contextual information determination services, information (e.g., weather, news, time etc.) based services, etc. In one embodiment, the services platform 113 may interact with the UE 101, the collaboration platform 109 and the content providers 117 to supplement or aid in the processing of the content information.

In one embodiment, the services 115 may be an online service that reflects interests and/or activities of users. In one scenario, the services 115 provide representations of each user (e.g., a profile), his/her social links, and a variety of additional information. The services 115 allow users to share location information, activities information, contextual information, historical user information and interests within their individual networks, and provides for data portability.

The content providers 117 may provide content to the UE 101, the collaboration platform 109, and the services 115 of the services platform 113. The content provided may be any type of content, such as textual content, image content, video content etc. In one embodiment, the content providers 117 may provide content that may supplement content of the applications 103, sensors 105, or a combination thereof. In one embodiment, the content providers 117 may also store content associated with the UE 101, the collaboration platform 109, and the services 115 of the services platform 113. In one embodiment, the content providers 117 may manage access to a central repository of data, and offer a consistent, standard interface to data.

By way of example, the UE 101, the collaboration platform 109, the services platform 113, and the content providers 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
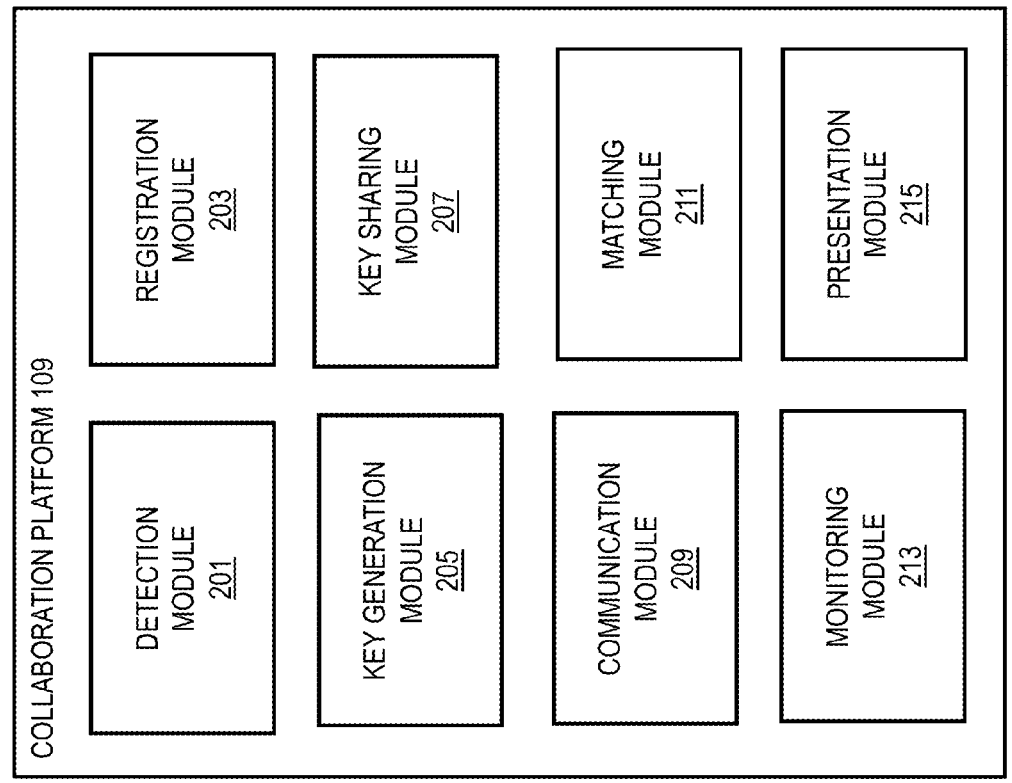
FIG. 2 is a diagram of the components of the collaboration platform 109, according to one embodiment.

FIG. 2 is a diagram of the components of the collaboration platform 109, according to one embodiment. By way of example, the collaboration platform 109 includes one or more components for generating and/or sharing of at least one key upon registering communication identifiers associated with one or more devices for an anonymous communication session. It is contemplated that the functions of these components may be combined in one or more components or performed by other components of equivalent functionality. In this embodiment, the collaboration platform 109 includes a detection module 201, a registration module 203, a key generation module 205, a key sharing module 207, a communication module 209, a matching module 211, a monitoring module 213, and a presentation module 215.

In one embodiment, the detection module 201 may detect one or more UE 101s that remains within a proximate range of the at least one UE 101 for a pre-defined time period via one or more sensors 105. In one scenario, the detection module 201 may determine proximity information between at least one UE 101 and one or more other UE 101 via near field communication, a wireless network, or a combination thereof. Subsequently, at least one UE 101 sends a request for at least one key to initiate anonymous communication with one or more other UE 101.

In one embodiment, the registration module 203 may register at least one UE 101, actual communication identifiers, or a combination thereof based, at least in part, on the request for at least one key. In one embodiment, actual communication identifiers include email address, phone number, social media information, or a combination thereof associated with at least one user of the at least one UE 101. In another embodiment, the registration module 203 may register one or more other UE 101, actual communication identifiers of users associated with the one or more other UE 101, or a combination thereof based, at least in part, on acceptance of the key for communication purposes.

In one embodiment, the key generation module 205 may generate a key for at least one UE 101 for anonymous communication with one or more other UE 101. In one scenario, the key generation module 205 may generate key based, at least in part, on the proximity information, the registration information, or a combination thereof received from the detection module 201 and the registration module 203. In one scenario, the registration module 203 may automatically register the contact information associated with one or more UE 101 for establishing communication session between the request sending UE 101 and the one or more other UE 101. The contact information of the users associated with the UE 101s is not disclosed. It is the key generated by the key generation module 205 that is shared between the one or more UE 101 during a communication session. In one embodiment, the at least one key is in a textual format.

In one embodiment, the key sharing module 207 may cause a sharing of the key generated by the key generation module 205 with one or more other UE 101s based, at least in part, on a determination that the one or more other UE 101s are within a proximity of the at least one UE 101. In one scenario, at least one key may be shared either via text messages (e.g. one or more users may send an email to the address of the key, whereby the one or more users may be registered to receive the messages that are later sent to the address of the key), audio messages (i.e. simply by saying it aloud, wherein one or more sensors may identify the speech via speech recognition mechanisms, whereby the one or more users may be registered to receive the messages that are later sent to the address of the key) etc.

In one embodiment, the communication module 209 may cause, at least in part, a relaying, a forwarding, or a combination thereof of the at least one communication from the at least one UE 101 to at least one of the one or more other UE 101s, one or more actual communication identifiers, or a combination thereof. In another embodiment, the communication module 209 may be used for communication between the various modules (i.e. 201-215). Further, the communication module 209 may be used to communicate commands, requests, data, etc.

In one embodiment, the matching module 211 may cause, at least in part, a processing of activities information, contextual information, or a combination thereof for one or more UE 101s. Then, the matching module 211 may cause, at least in part, a categorization of one or more devices, based, at least in part, on the processing. Subsequently, the matching module 211 may cause, at least in part, a matching of the key with the categorization of one or more devices.

In one embodiment, the monitoring module 213 may cause a monitoring of relevancy information, usage information, or a combination thereof for at least one key continuously, periodically, according to a schedule, or a combination thereof. Then, the monitoring module 213 may determine, at least in part, the validity for at least one key based, at least in part, on the monitoring.

In one embodiment, the presentation module 215 may obtain a set of summary statistics from the other modules. Then, the presentation module 215 continues with generating a presentation corresponding to the request of the at least one user. In one embodiment, the presentation module 215 may cause a presentation of at least one key to the one or more UE 101s during a group communication in at least one timeline user interface. In another embodiment, the presentation module 215 may cause, at least in part, a presentation of confirmation response from other devices within certain proximity upon successful receipt of the at least one key in at least one timeline user interface.

The above presented modules and components of the collaboration platform 109 can be implemented in hardware, firmware, software, or a combination thereof. Though depicted as a separate entity in FIG. 1, it is contemplated that the collaboration platform 109 may be implemented for direct operation by respective UE 101. As such, the collaboration platform 109 may generate direct signal inputs by way of the operating system of the UE 101 for interacting with the application 103. In another embodiment, one or more of the modules 201-215 may be implemented for operation by respective UEs, as a collaboration platform 109. Still further, the collaboration platform 109 may be integrated for direct operation with services 115, such as in the form of a widget or applet, in accordance with an information and/or subscriber sharing arrangement. The various executions presented herein contemplate any and all arrangements and models.

Figure 3:
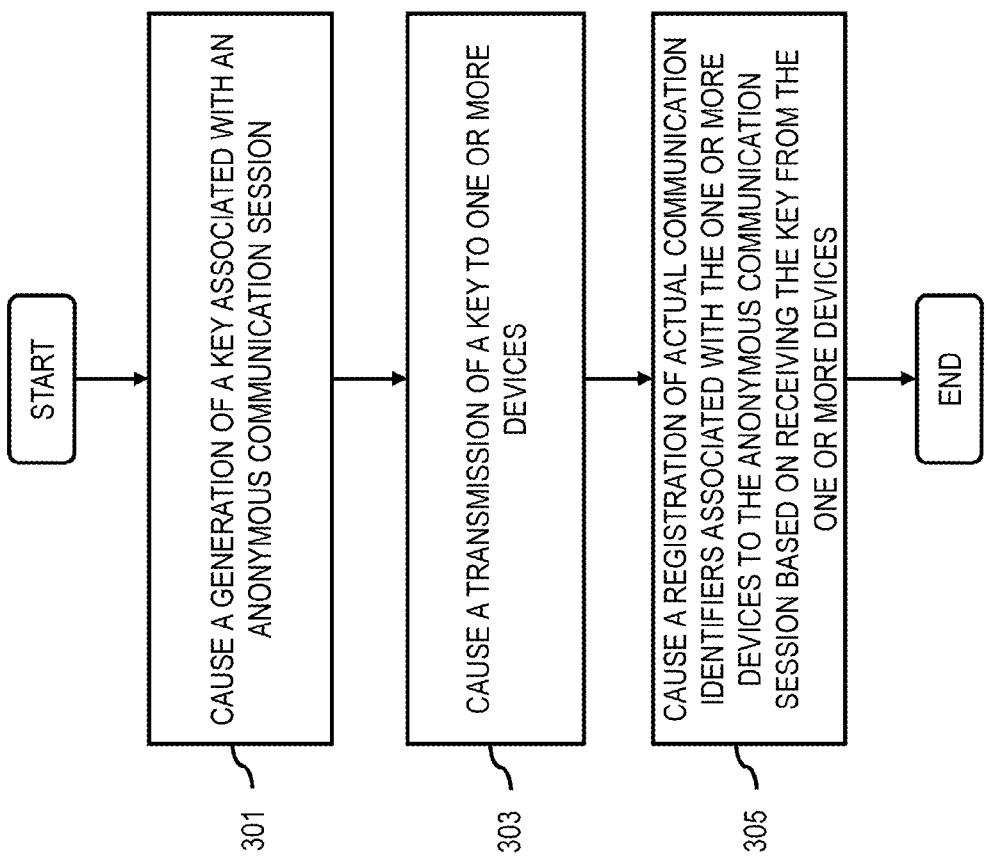
FIG. 3 is a flowchart of a process for generating and/or sharing of at least one key upon registering communication identifiers associated with one or more devices for an anonymous communication session, according to one embodiment.
Figure 10:
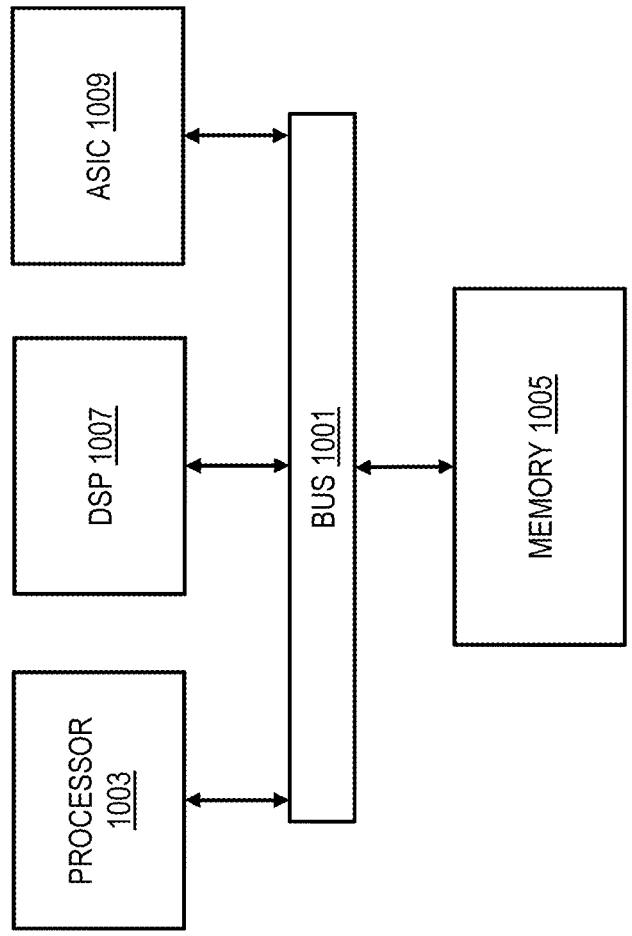
FIG. 10 is a diagram of a chip set that can be used to implement an embodiment of the invention.

FIG. 3 is a flowchart of a process for generating and/or sharing of at least one key upon registering communication identifiers associated with one or more devices for an anonymous communication session, according to one embodiment. In one embodiment, the collaboration platform 109 performs the process 300 and is implemented in, for instance, a chip set including a processor and a memory as shown in FIG. 10.

In step 301, the collaboration platform 109 may cause, at least in part, a generation of at least one key associated with at least one anonymous communication session. In one example embodiment, a UE 101 sends a request to the collaboration platform 109 to generate a key for initiating an anonymous communication session. Then, the collaboration platform 109 may generate a key based on the request, and registers the email address, phone number etc. associated with the request sending UE 101. In another example embodiment, the collaboration platform 109 may receive inputs from the detection module 201 that the one or more UE 101s have remained in proximity for a certain time period, whereupon the collaboration platform 109 may generate a key for anonymous communication session between the detected UE 101s.

In step 303, the collaboration platform 109 may cause, at least in part, a transmission of the at least one key to one or more devices. In one example embodiment, the collaboration platform 109 may determine proximity information between at least one UE 101 and one or more other UE 101s via a near field communication, a wireless network, or a combination thereof. Then, the collaboration platform 109 may transmit the key to one or more proximate devices. In one scenario, it is not possible to transmit a key through a cloud based service in an anonymous manner. The cloud based service requires information on the recipients device (e.g. the IP address of a device) to send the key. Therefore, transmission of at least one key can be implemented in a peer-to-peer network to maintain privacy. Such transmission may be based on proximity information between one or more UE 101, wherein at least one UE 101 that detects another UE 101 within a proximity threshold may transmit the key via near field communications.

In step 305, the collaboration platform 109 may cause, at least in part, a registration of one or more actual communication identifiers associated with the one or more devices to the at least one anonymous communication session based, at least in part, on receiving the at least one key from the one or more devices, wherein the registration does not expose the one or more actual communication identifiers to the one or more devices of the at least one anonymous communication session. In one embodiment, the one or more actual communication identifiers include, at least in part, one or more email addresses, one or more phone numbers, one or more social media user identifiers, or a combination thereof associated with the one or more devices.

Figure 4:
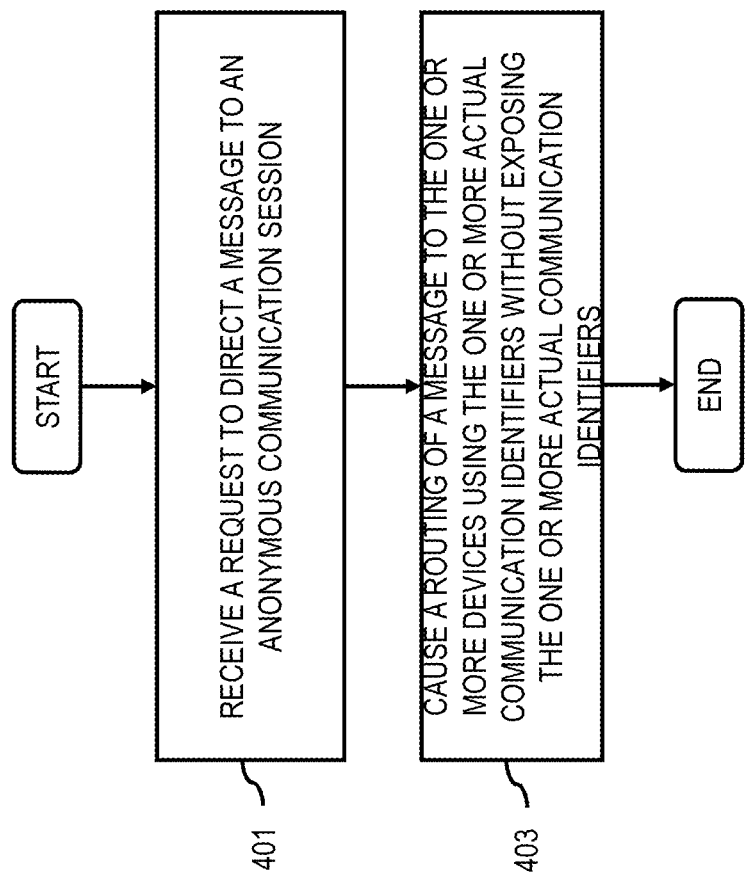
FIG. 4 is a flowchart of a process for routing at least one message to one or more devices in an anonymous communication session based on a request, according to one embodiment.

FIG. 4 is a flowchart of a process for routing at least one message to one or more devices in an anonymous communication session based on a request, according to one embodiment. In one embodiment, the collaboration platform 109 performs the process 400 and is implemented in, for instance, a chip set including a processor and a memory as shown in FIG. 10.

In step 401, the collaboration platform 109 may receive a request to direct at least one message to at least one anonymous communication session, wherein the request specifies, at least in part, the at least one key. In one example embodiment, at least one UE 101 may send a message to the key (e.g. key email address), whereupon the collaboration platform 109 may forward the message to the registered UE 101s without disclosing their identification.

In step 403, the collaboration platform 109 may cause, at least in part, a routing of the at least one message to the one or more devices using the one or more actual communication identifiers without exposing the one or more actual communication identifiers. In one example embodiment, the collaboration platform 109 may relay at least one communication from the at least one UE 101 to email addresses, phone numbers, social media user identifiers associated with one or more devices registered for the anonymous communication session.

Figure 5:
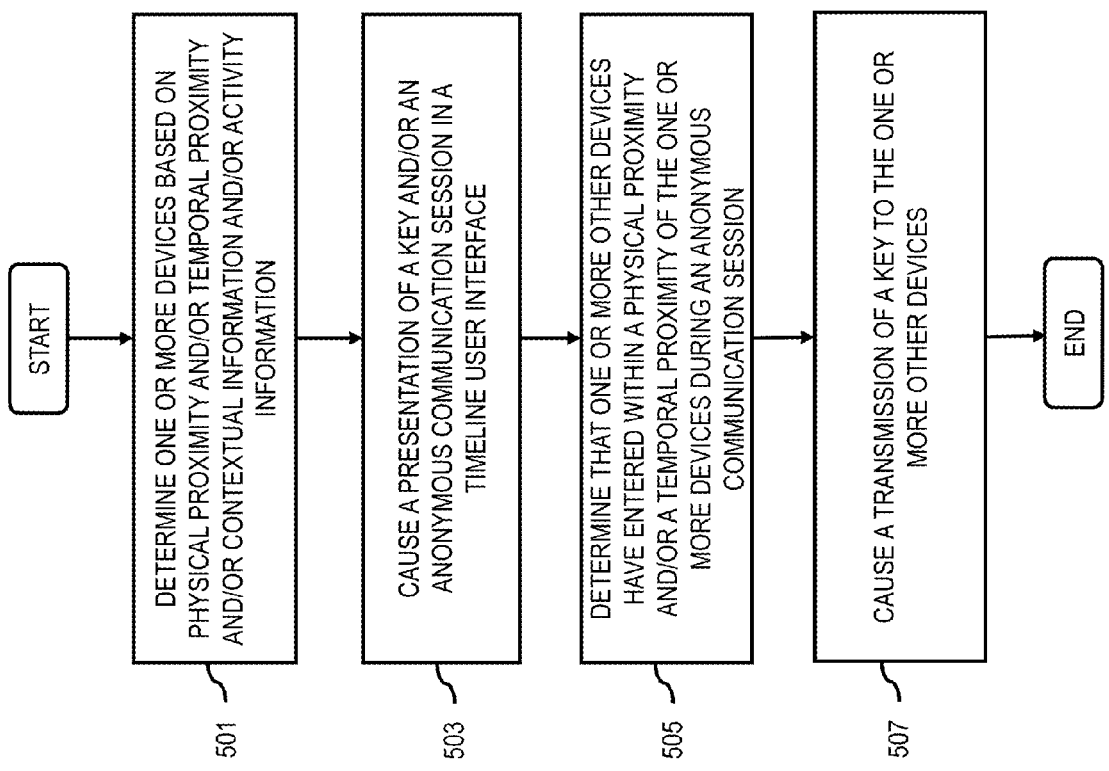
FIG. 5 is a flowchart of a process for causing a transmission of at least one key to the one or more other devices based on physical proximity, a temporal proximity, contextual information, activity information, or a combination thereof, according to one embodiment.

FIG. 5 is a flowchart of a process for causing a transmission of at least one key to the one or more other devices based on physical proximity, a temporal proximity, contextual information, activity information, or a combination thereof, according to one embodiment. In one embodiment, the collaboration platform 109 performs the process 500 and is implemented in, for instance, a chip set including a processor and a memory as shown in FIG. 10.

In step 501, the collaboration platform 109 may determine the one or more devices based, at least in part, on a physical proximity, a temporal proximity, contextual information, activity information, or a combination thereof. In one example embodiment, the collaboration platform 109 may determine the distance between one or more UE 101, and the duration for which the one or more UE 101 maintains the distance. In another embodiment, the collaboration platform 109 may process activity information, contextual information, or a combination thereof associated with one or more devices to create a group for communication session.

In step 503, the collaboration platform 109 may cause, at least in part, a presentation of the at least one key, the at least one anonymous communication session, or a combination thereof in at least one timeline user interface. In one embodiment, the timeline user interface is categorized by the physical proximity, the temporal proximity, the contextual information, the activity information, or a combination thereof.

In step 505, the collaboration platform 109 may determine that one or more other devices have entered within a physical proximity, a temporal proximity, or a combination thereof of the one or more devices during the at least one anonymous communication session. Then, the collaboration platform 109 may share the key with the one or more other detected devices to initiate a communication session.

In step 507, the collaboration platform 109 may cause, at least in part, a transmission of the at least one key to the one or more other devices. In one example embodiment, the detection module 201 may detect other UE 101 within proximate distance from the one or more device engaged in an anonymous communication session. Then, the collaboration platform 109 may transmit the key to the detected devices.

Figure 6:
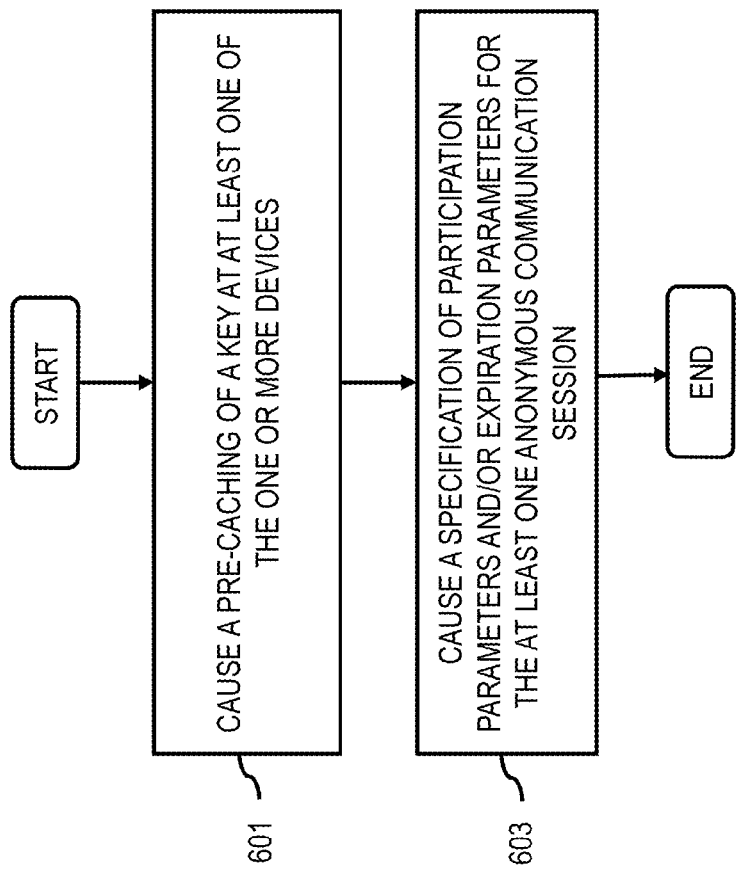
FIG. 6 is a flowchart of a process for storing at least one key that is expected to be used in near future, and causing a specification of participation parameters and/or expiration parameters, according to one embodiment.

FIG. 6 is a flowchart of a process for storing at least one key that is expected to be used in near future, and causing a specification of participation parameters and/or expiration parameters, according to one embodiment. In one embodiment, the collaboration platform 109 performs the process 600 and is implemented in, for instance, a chip set including a processor and a memory as shown in FIG. 10.

In step 601, the collaboration platform 109 may cause, at least in part, a pre-caching of the at least one key at at least one of the one or more devices, wherein a transmission of the at least one key by the at least one of the one or more devices initiates the at least one anonymous communication session. In one scenario, when one or more UE 101 communicates with the collaboration platform 109 requesting for keys, the collaboration platform 109 may 'pre-give' keys to the one or more UE 101. As a result, when a UE 101 wants to start a new communication session, it may use the key without interacting with the collaboration platform 109.

In step 603, the collaboration platform 109 may cause, at least in part, a specification of one or more participation parameters, one or more expiration parameters, or a combination thereof for the at least one anonymous communication session. In one example embodiment, the key remains relevant based, at least in part, on the number of users registered to the key, a new user joining the key, any other criteria, or a combination thereof. In another example embodiment, the collaboration platform 109 may cause a monitoring of the relevancy information, the usage information, or a combination thereof for at least one key to determine the validity of the key.

Figure 7:
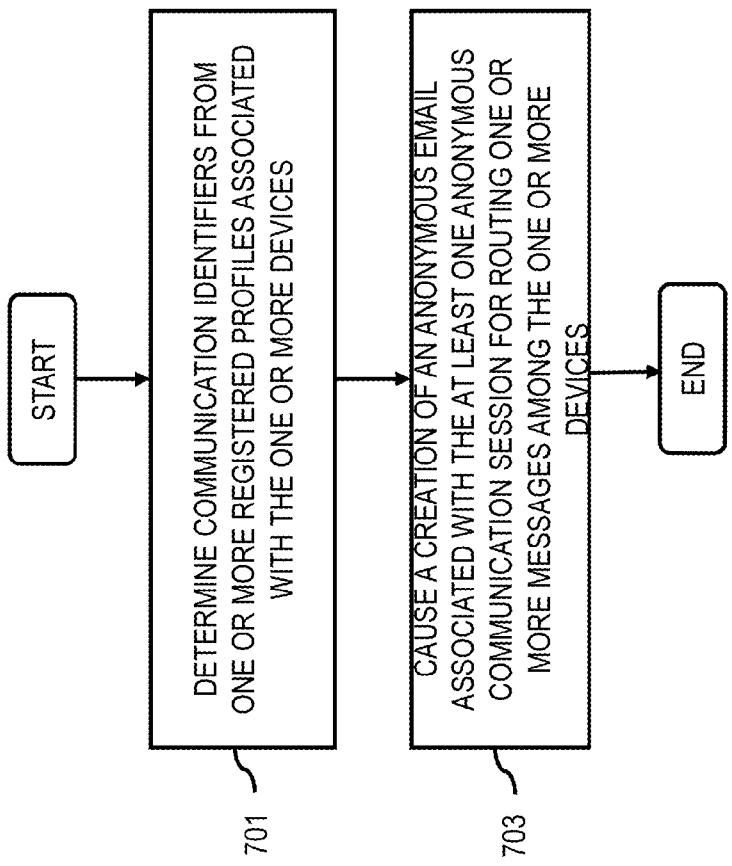
FIG. 7 is a flowchart of a process for determining communication identifiers from the registered profiles, and causing a creation of an anonymous email based on the key, according to one embodiment.

FIG. 7 is a flowchart of a process for determining communication identifiers from the registered profiles associated with one or more devices, and causing a creation of at least one anonymous email based on the key, according to one embodiment. In one embodiment, the collaboration platform 109 performs the process 700 and is implemented in, for instance, a chip set including a processor and a memory as shown in FIG. 10.

In step 701, the collaboration platform 109 may determine the one or more communication identifiers from one or more registered profiles associated with the one or more devices. In one embodiment, the communication identifiers include email addresses, phone numbers, social media information, or a combination thereof.

In step 703, the collaboration platform 109 may cause, at least in part, a creation of at least one anonymous email associated with the at least one anonymous communication session for routing one or more messages among the one or more devices. In one embodiment, the at least one anonymous email is based, at least in part, on the at least one key.

FIGS. 8 A-D are user interface diagrams utilized in the processes of FIGS. 3-7, according to various example embodiments. FIG. 8A represents a scenario wherein at least one UE 101 is requesting a key for initiating anonymous communication session with other nearby devices, according to one example embodiment. In one scenario, at least one UE 101 may detect that it is in the range of other UE 101 for a certain time-period [801]. Then, the at least one UE 101 may take the initiative of requesting a random key from the collaboration platform 109 [803]. Subsequently, the collaboration platform 109 may generate a key based, at least in part, on the request from at least one device, detection of one or more other devices within proximity range of the at least one device for a pre-defined time period, or a combination thereof. In one scenario, the collaboration platform 109 may automatically register the at least one device, the contact information for at least one user associated with the at least one device, or a combination thereof for establishing a communication session with one or more nearby devices.

Figure 8A:
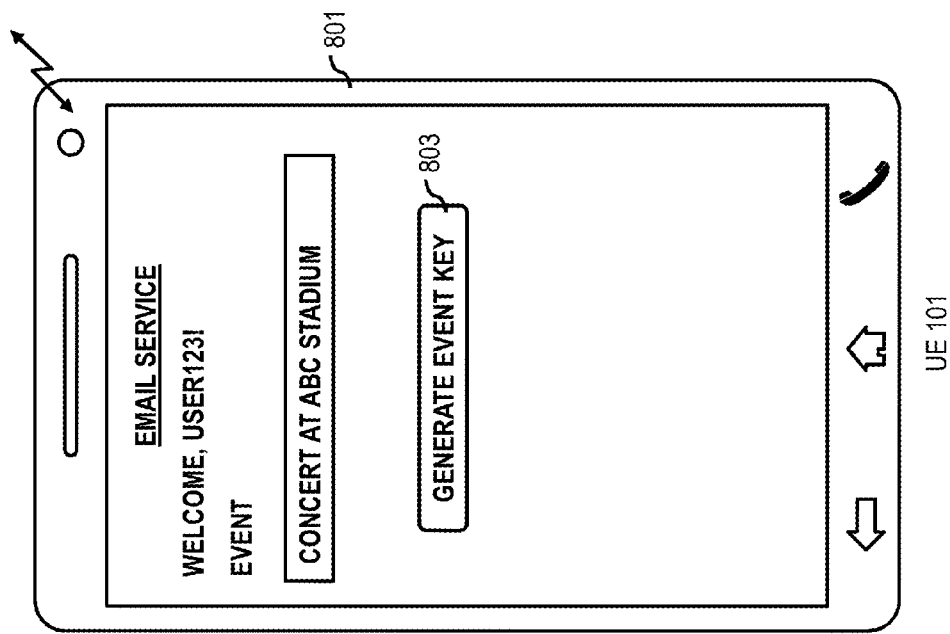
FIG. 8A represents a scenario wherein at least one UE 101 is requesting a key for initiating anonymous communication session with other nearby devices, according to one example embodiment.
Figure 8B:
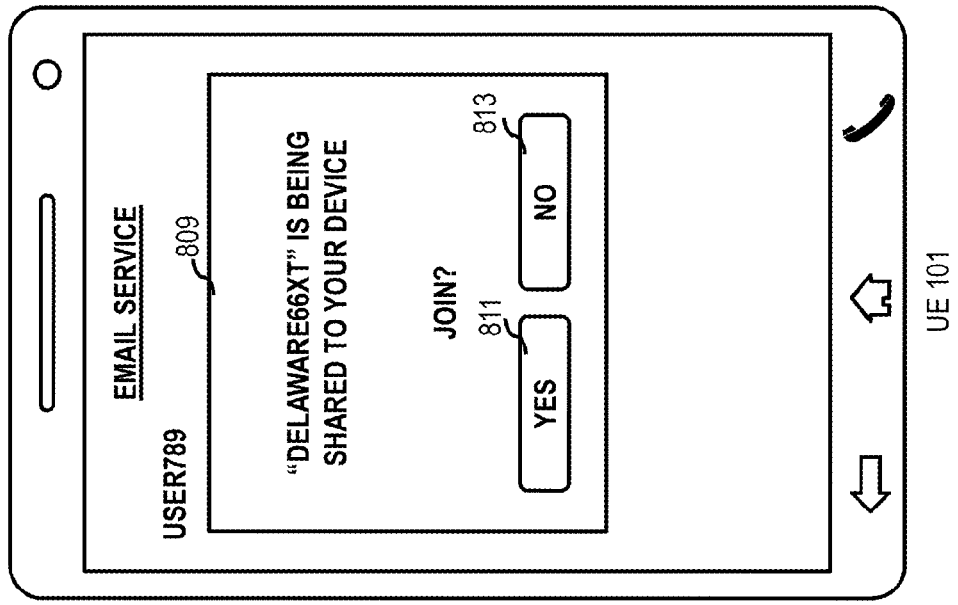
FIG. 8B represents a scenario wherein at least one user device detects one or more other nearby user devices for sharing a key, according to one example embodiment.
Figure 8B:
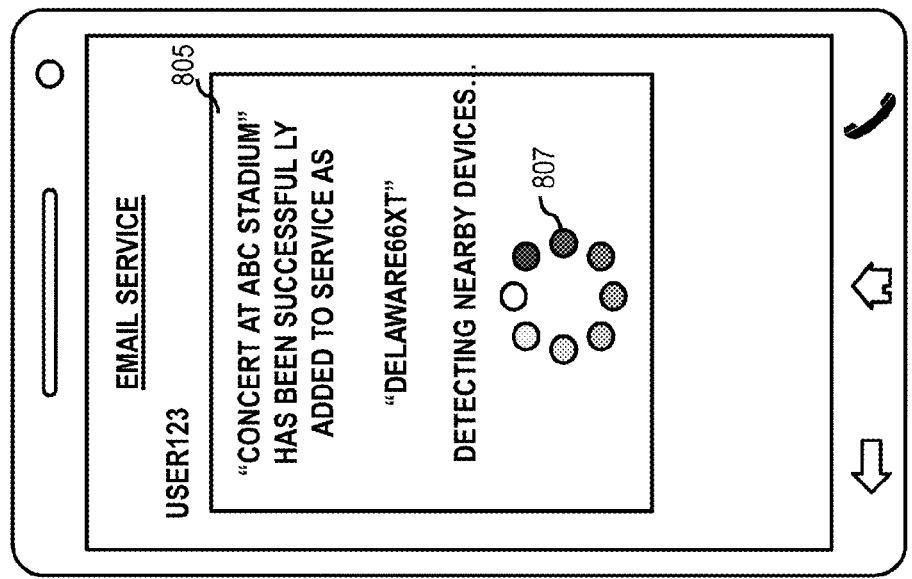

FIG. 8B represents a scenario wherein at least one user device detects one or more other nearby user devices for sharing a key, according to one example embodiment. In one scenario, at least one UE 101 may create an event [805] for generating a key. Then, the UE 101 may initiate detecting nearby UE 101s via one or more sensors for sharing the key information [807]. Subsequently, the collaboration platform 109 may share the generated key with one or more other nearby UE 101s. This process may involve causing a presentation in one or more nearby UE 101s [809], wherein users associated with one or more nearby UE 101s may access the key based, at least in part, on their input [811, 813].

FIG. 8C represents a scenario wherein at least one device receives confirmation notification of receipt of a key by other nearby devices, according to one example embodiment. In one scenario, the collaboration platform 109 may cause a presentation of successful receipt of the key in at least one UE 101 upon acceptance of the key by one or more nearby UE 101s [815]. The process of key acceptance may involve one or more users associated with other nearby UE 101s being presented with an option to register their email address or other social media information in exchange for a key [817, 819]. In one scenario, the collaboration platform 109 may cause a matching of at least one key with the location information, contextual information, or a combination thereof associated with at least one device, at least one user associated with at least one device, or a combination thereof.

Figure 8D:
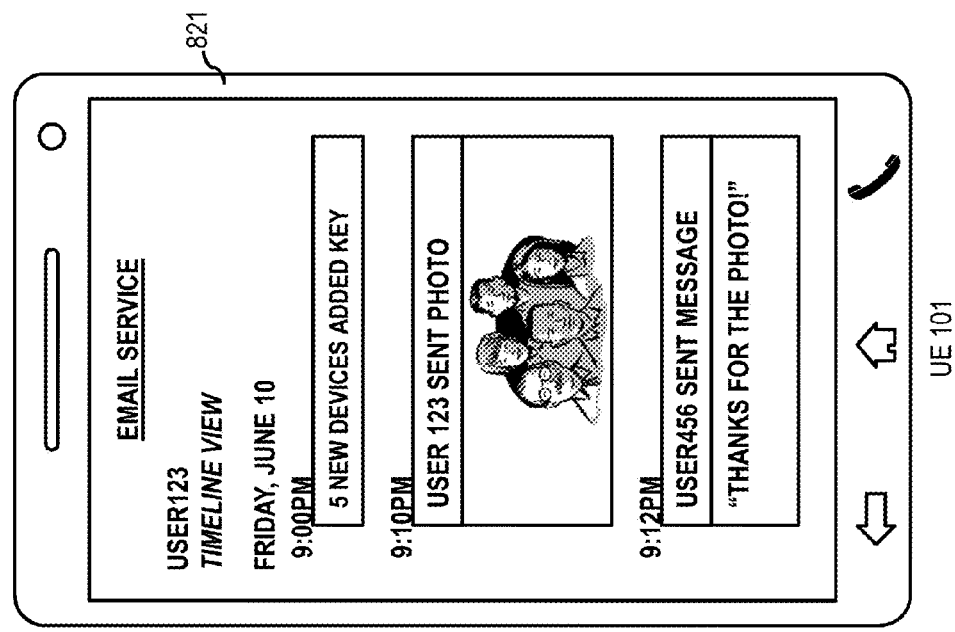
FIG. 8D represents a scenario wherein a user activity is presented in a historical timeline view, according to one example embodiment.

FIG. 8D represents a scenario wherein a user activity is presented in a historical timeline view, according to one example embodiment. In one scenario, a user may be presented with activity information for at least one event [821], for example, one or more devices adding the key etc. Then, whenever a user wishes to contact the group that has added the key, he/she may simply send an email to the email address of the key (e.g. <key>@theservicename.com.) The collaboration platform 109 may cause a forwarding of one or more communication sent by the user.

The processes described herein for generating and/or sharing of at least one key upon registering communication identifiers associated with one or more devices for an anonymous communication session may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
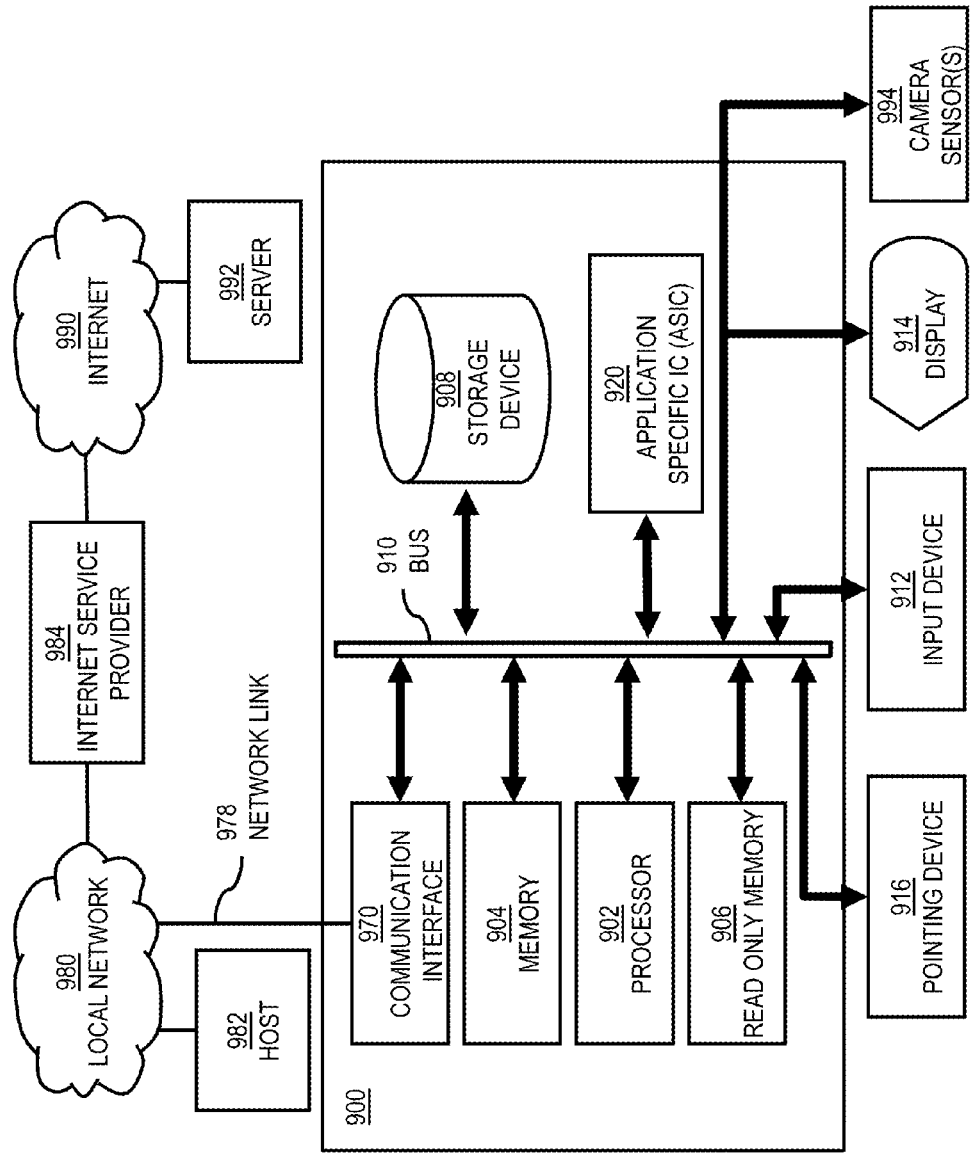
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to generate and/or share at least one key upon registering communication identifiers associated with one or more devices for an anonymous communication session as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of generating and/or sharing of at least one key upon registering communication identifiers associated with one or more devices for an anonymous communication session.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to generating and/or sharing of at least one key upon registering communication identifiers associated with one or more devices for an anonymous communication session. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 900 also includes a memory 904 coupled to bus 910. The memory 904, such as a random access memory (RAM) or any other dynamic storage device, stores information including processor instructions for generating and/or sharing of at least one key upon registering communication identifiers associated with one or more devices for an anonymous communication session. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for generating and/or sharing of at least one key upon registering communication identifiers associated with one or more devices for an anonymous communication session, is provided to the bus 910 for use by the processor from an external input device 912, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914, and one or more camera sensors 994 for capturing, recording and causing to store one or more still and/or moving images (e.g., videos, movies, etc.) which also may comprise audio recordings. In some embodiments, for example, in embodiments in which the computer system 900 performs all functions automatically without human input, one or more of external input device 912, display device 914 and pointing device 916 may be omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 107 for generating and/or sharing of at least one key upon registering communication identifiers associated with one or more devices for an anonymous communication session to the UE 101.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to generate and/or share at least one key upon registering communication identifiers associated with one or more devices for an anonymous communication session as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of generating and/or sharing of at least one key upon registering communication identifiers associated with one or more devices for an anonymous communication session.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to generate and/or share at least one key upon registering communication identifiers associated with one or more devices for an anonymous communication session. The memory 1005 also stores the data associated with or generated by the execution of the inventive steps.

Figure 11:
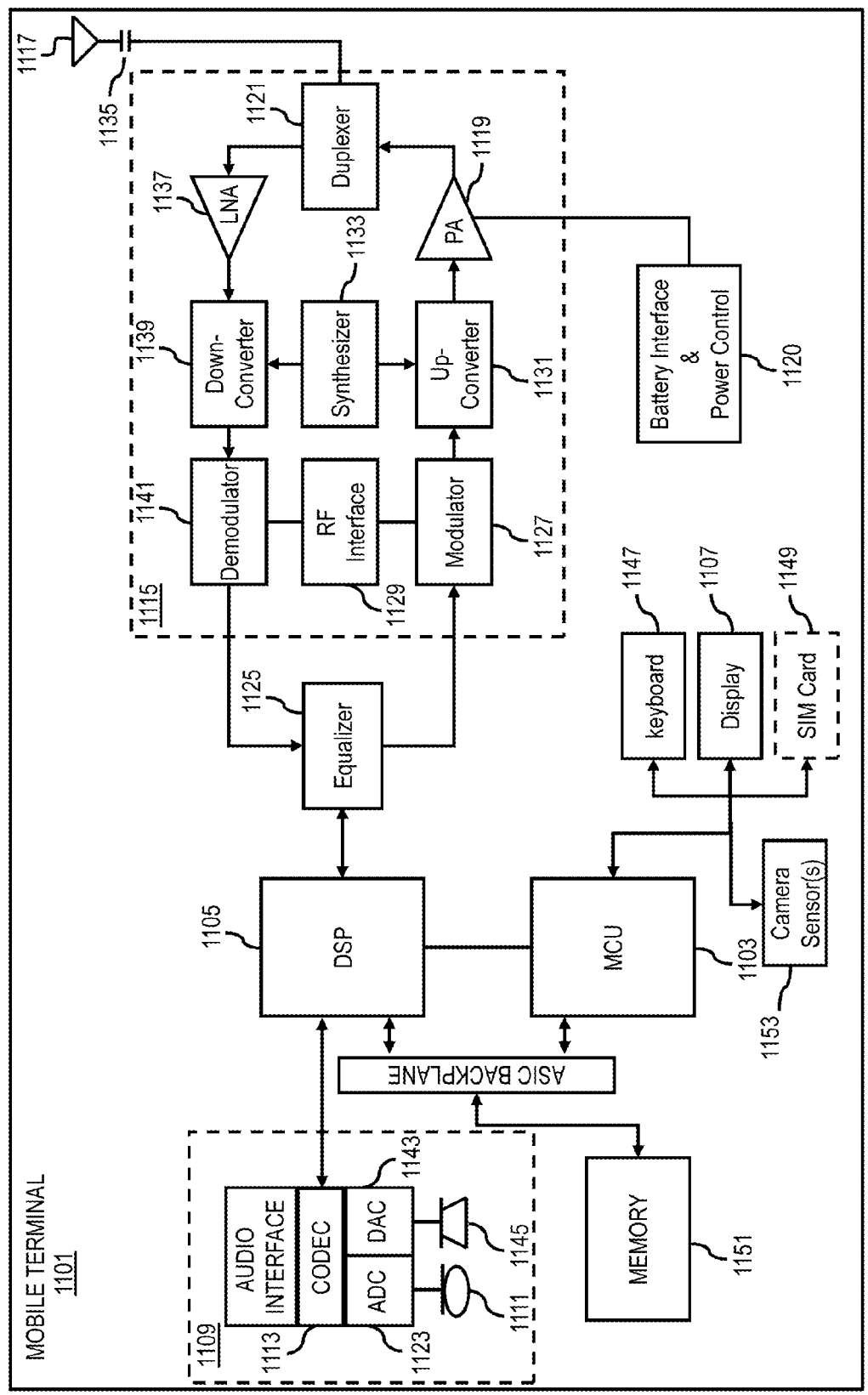
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of generating and/or sharing of at least one key upon registering communication identifiers associated with one or more devices for an anonymous communication session. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of generating and/or sharing of at least one key upon registering communication identifiers associated with one or more devices for an anonymous communication session. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to generate and/or share at least one key upon registering communication identifiers associated with one or more devices for an anonymous communication session. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

Further, one or more camera sensors 1153 may be incorporated onto the mobile station 1101 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    detecting, by a user device, one or more other user devices located in proximity to the user device using near field communication;
    retrieving, by the user device, at least one key for establishing at least one anonymous communication session among the user device and the one or more other user devices;
    transmitting, by the user device, the at least one key to the one or more other user devices;
    transmitting, by the user device, a request for establishing the at least one anonymous communication session to a server, wherein the request specifies an actual communication identifier of the user device and the at least one key, and the server registers the actual communication identifier of the user device and at least one actual communication identifier of at least one of the other user devices that receives the at least one key and accepts the at least one anonymous communication session; and
    transmitting, by the user device, content to the at least one of the other user devices via the at least one anonymous communication session facilitated by the server, wherein the server does not expose the at least one actual communication identifier to the user device or the actual communication identifier to the at least one of the other user devices.

2. A method of claim 1, wherein the at least one key is transmitted to the one or more other user devices using the near field communication.

3. A method of claim 1, wherein the actual communication identifiers include, at least in part, one or more email addresses, one or more phone numbers, one or more social media user identifiers, or a combination thereof associated with the user device and the at least one of the other user devices.

4. A method of claim 1, wherein the server matches the at least one of the other user devices further based on contextual information, activity information, or a combination thereof, for transmitting the content thereto.

5. A method of claim 4, further comprising:
    initiating a presentation of the at least one key, the at least one anonymous communication session, or a combination thereof in at least one timeline user interface of the user device,
    wherein the timeline user interface is categorized by physical proximity, temporal proximity, the contextual information, the activity information, or a combination thereof.

6. A method of claim 1, further comprising:
    determining that one or more additional user devices newly enter within a physical proximity, a temporal proximity, or a combination thereof of the at least one of the other user devices during the at least one anonymous communication session; and
    initiating a transmission of the at least one key to the one or more additional user devices.

7. A method of claim 1, further comprising:
    initiating a generation or a pre-caching of the at least one key at the user device.

8. A method of claim 1, further comprising:
    initiating a specification of one or more participation parameters, one or more expiration parameters, or a combination thereof for the at least one anonymous communication session.

9. A method of claim 1, wherein the server determines the one or more actual communication identifiers from one or more registered profiles associated with the user device and the at least one of the other user devices.

10. A method of claim 1, wherein the at least one anonymous communication session is an anonymous email communication session, the method further comprising:
    initiating a creation of at least one anonymous email associated with the at least one anonymous communication session for routing one or more messages among the one or more devices,
    wherein the at least one anonymous email is a group email address set for the user device and the at least one of the other user devices, and the group email address specifies the at least one key.

11. An apparatus comprising:
    at least one processor; and
    at least one memory including computer program code for one or more programs,
    the at least one memory and the computer program code configured to, with the at least one processor, cause the apparatus embedded in a user device to perform at least the following, initiate a detection of one or more other user devices located in proximity to the user device using near field communication;

retrieve at least one key for establishing at least one anonymous communication session among the user device and the one or more other user devices;

initiate a transmission of the at least one key to the one or more other user devices;

initiate a transmission of a request for establishing the at least one anonymous communication session to a server, wherein the request specifies an actual communication identifier of the user device and the at least one key, and the server registers the actual communication identifier of the user device and at least one actual communication identifier of at least one of the other user devices that receives the at least one key and accepts the at least one anonymous communication session; and initiate a transmission of content to the at least one of the other user devices via the at least one anonymous communication session facilitated by the server, wherein the server does not expose the at least one actual communication identifier to the user device or the actual communication identifier to the at least one of the other user devices.

12. An apparatus of claim 11, wherein the at least one key is transmitted to the one or more other user devices using the near field communication.

13. An apparatus of claim 11, wherein the actual communication identifiers include, at least in part, one or more email addresses, one or more phone numbers, one or more social media user identifiers, or a combination thereof associated with the user device and the at least one of the other user devices.

14. An apparatus of claim 11, wherein the server matches the at least one of the other user devices further based on contextual information, activity information, or a combination thereof, for transmitting the content thereto.

15. An apparatus of claim 14, wherein the apparatus is further caused to:

initiate a presentation of the at least one key, the at least one anonymous communication session, or a combination thereof in at least one timeline user interface of the user device, wherein the timeline user interface is categorized by physical proximity, temporal proximity, the contextual information, the activity information, or a combination thereof.

16. An apparatus of claim 11, wherein the apparatus is further caused to:

determine that one or more additional user devices newly enter within a physical proximity, a temporal proximity, or a combination thereof of the at least one of the other user devices during the at least one anonymous communication session; and initiate a transmission of the at least one key to the one or more additional user devices.

17. An apparatus of claim 11, wherein the apparatus is further caused to:

initiate a generation or a pre-caching of the at least one key at the user device.

18. A non-transitory computer-readable storage medium carrying one or more sequences of one or more instructions which, when executed by one or more processors, cause an apparatus embedded in a user device to at least perform the following steps:

initiating a detection of one or more other user devices located in proximity to the user device using near field communication;

retrieving at least one key for establishing at least one anonymous communication session among the user device and the one or more other user devices;

initiating a transmission of the at least one key to the one or more other user devices;

initiating a transmission of a request for establishing the at least one anonymous communication session to a server, wherein the request specifies an actual communication identifier of the user device and the at least one key, and the server registers the actual communication identifier of the user device and at least one actual communication identifier of at least one of the other user devices that receives the at least one key and accepts the at least one anonymous communication session; and initiating a transmission of content to the at least one of the other user devices via the at least one anonymous communication session facilitated by the server, wherein the server does not expose the at least one actual communication identifier to the user device or the actual communication identifier to the at least one of the other user devices.

19. A non-transitory computer-readable storage medium of claim 18, wherein the at least one key is transmitted to the one or more other user devices using the near field communication.

20. A non-transitory computer-readable storage medium of claim 18, wherein the actual communication identifiers include, at least in part, one or more email addresses, one or more phone numbers, one or more social media user identifiers, or a combination thereof associated with the user device and the at least one of the other user devices.

* * * * *